United States Patent
Awad

(10) Patent No.: US 7,077,177 B2
(45) Date of Patent: Jul. 18, 2006

(54) CLAMP WITH CANISTER ENTRY AND METHOD OF USE IN PROVIDING LIQUID EXCHANGE

(75) Inventor: Adam Awad, Costa Mesa, CA (US)

(73) Assignee: Link New Tech, Inc., Pomona, CA (US)

( * ) Notice: Subject to any disclaimer, the term of this patent is extended or adjusted under 35 U.S.C. 154(b) by 2 days.

(21) Appl. No.: 10/910,079

(22) Filed: Aug. 2, 2004

(65) Prior Publication Data

US 2005/0016627 A1 Jan. 27, 2005

Related U.S. Application Data

(63) Continuation-in-part of application No. 10/266,529, filed on Oct. 8, 2002, now abandoned.

(51) Int. Cl.
*B65B 1/04* (2006.01)

(52) U.S. Cl. .................. 141/330; 141/98; 81/426.5

(58) Field of Classification Search .................. 141/1, 141/7, 65–67, 98, 329, 330, 346; 137/318, 137/15.05; 7/100; 81/2, 3.4, 3.44, 411, 81/414, 418, 424.5, 426.5; 222/80–83
See application file for complete search history.

(56) References Cited

U.S. PATENT DOCUMENTS

| | | | | |
|---|---|---|---|---|
| 2,555,591 | A * | 6/1951 | Kane, Jr. | 285/334.5 |
| 5,291,914 | A * | 3/1994 | Bares et al. | 137/15.13 |
| 5,398,718 | A * | 3/1995 | Roinick, Sr. | 137/318 |
| 5,896,886 | A * | 4/1999 | Wendt | 137/318 |
| 6,053,362 | A * | 4/2000 | Lin | 222/80 |

* cited by examiner

*Primary Examiner*—Timothy L. Maust
(74) *Attorney, Agent, or Firm*—Gene Scott, Patent Law & Venture Group

(57) ABSTRACT

A fluid exchange is provided through the wall of a canister using a clamp having a pair of jaws enabled for gripping the canister. The pair of jaws provides a tubular entry device positioned for penetrating the canister when the jaws are tightened on the canister. The entry device provides a hole cutter and a hole sealer. The pair of jaws also provides a rotational conformal surface for nesting contact with the canister so as to improve the ability of the clamp to secure itself on the canister.

21 Claims, 2 Drawing Sheets

CLAMP WITH CANISTER ENTRY AND METHOD OF USE IN PROVIDING LIQUID EXCHANGE

RELATED APPLICATIONS

This application is a Continuation In Part Application of a prior filed application having Ser. No. 10/266,529 and filing date of Oct. 8, 2002, now abandoned and entitled: Apparatus and Method for Flushing and Cleaning Engine Lubrication Systems.

BACKGROUND OF THE INVENTION

1. Incorporation by Reference

Applicant(s) hereby incorporate herein by reference, any and all U.S. patents and U.S. patent applications cited or referred to in this application.

2. Field of the Invention

This invention relates generally to apparatus and methods for securing entry to a liquid system for purposes of liquid exchange.

3. Description of Related Art

The following art defines the present state of this field:

Akazawa, U.S. Pat. No. 5,573,045 describes an engine coolant changing apparatus for changing an engine coolant such as LLC (long-life coolant) in an engine coolant path containing a radiator, comprising coolant storing container possessing a pressure action port and a liquid inlet and outlet, detaching device to be attached or detached to or from a filler port of a radiator, communicating device for communicating between the liquid inlet and outlet and the detaching means, and pressure action device for applying a negative pressure to the pressure action port and for concurrently causing overheating and the coolant to a low temperature by driving an engine when discharging the coolant from an engine coolant system, and device for applying a positive pressure to the pressure action port when feeding a fresh liquid, so that the coolant can be changed promptly in a short time, without requiring manipulation of radiator drain cock or jack-up of the vehicle.

Abbruzze, U.S. Pat. No. 6,142,161 describes a clog resistant oil pan adapter for an engine flushing system having a main body portion having an interior duct, a tubular connector hub with a primary fluid entry port at the proximal end of the main body portion for connecting with the oil pan drain port, and a distal portion with an annulus with one or more exit ports. One or more secondary fluid entry ports are also formed in the proximal end portion of the tubular connector hub connecting with the interior duct for also receiving flushing fluid from the oil pan interior chamber. The secondary side fluid entry ports can be formed in the proximal end portion of the tubular connector hub and connecting with the primary fluid entry port at the end of the tubular connector hub. Alternatively, the secondary fluid entry ports can be formed in the proximal end portion of the tubular connector hub, and spaced apart from the primary fluid entry port.

Grigorian, U.S. Pat. Nos. 6,089,205, 5,921,213, 5,813,382 and 5,791,310 describe an adapter assembly for an engine flushing system including an oil filter port adapter assembly and an oil drain plug port adapter assembly for connection between an engine flushing apparatus and the lubrication system of an internal combustion engine. A plurality of adapter members of the oil filter adapter assembly are releasably secured together by a low tolerance sliding fit and indexed together by indexing pins in a low tolerance sliding fit, to prevent the connection between the adapter members from seizing up. In one embodiment, for a recessed, cartridge-type oil filter port accessible via the drain pan, the filter port adapter assembly comprises a first filter port adapter member, one end of which is placed within the filter port, and a second end of which is connected to the fluid supply conduit connected to the flushing apparatus. A second filter port adapter member having an internal passageway for receiving the second end of the first filter port adapter member is externally threaded to be connected within a correspondingly internally threaded opening of the drain pan.

Flynn, U.S. Pat No. 6,298,947 and describes an engine cleaning system having a cleaning solution container having a filter element therein and is adapted to establish a predetermined quantity of solution for a particular engine. Solution is pumped from the solution container to the engine interior by the engine oil pump, and a solution drain line connects the engine interior and the solution container. Oil and cleaning solution are pumped by the engine oil pump continuously during the cleaning process. The solution container has a removable closure for filter replacement and a drain valve for solution and oil.

Flynn, U.S. Pat. No. 6,263,889 describes an engine oil system cleaning apparatus having a cleaning solution delivery line connected by an adapter to a running engine, and an exit line and a return line from the engine connected at an adapter at the engine oil pan. A fail-safe loop flow circuit, including the exit line and solution delivery line, is provided upon sensing of a pressure drop in the delivery line to operate valves to effect flow through the fail-safe circuit.

Flynn, U.S. Pat. No. 5,833,765 describes that carbon deposits and related residue may be removed from the internal surfaces of components of an internal combustion engine, particularly the fuel ports of a carbureted engine and the injection nozzles of a fuel injection engine, by circulating an engine conditioning fuel, through the engine utilizing a conditioning fuel pump, preferably driven by a fluid driven motor, for pumping conditioning fuel to the engine. The conditioning apparatus can detect leakage of the fuel pressure regulator of a fuel injected engine and can operate in both a one-line mode in which conditioning fuel flows one way from the apparatus to the engine and a two-line mode wherein the conditioning fuel is recirculated through the engine and conditioning apparatus. A preferred embodiment provides diagnostic features for checking the conditioning apparatus and certain engine components. These include a by-pass conduit between a flowmeter input side and an engine pressure regulator, check valve means to test opening pressure of the pressure regulator, a pressure control valve to restrict flow to reduce pressure below a set pressure regulator opening pressure to indicate leakage, a shut-off valve closable to provide indication of static system pressure produced by the engine fuel pump, and openable to provide indication of flow rate produced by the fuel pump.

Edmiston et al., U.S. Pat. No. 6,318,388 describes an engine flushing apparatus for providing a convenient and easily portable complete apparatus for flushing the oil-lubricated portions of an engine. The engine flushing apparatus includes a solution tank for holding a solution. The solution tank comprises an upper opening and a substantially hollow interior. A suction conduit extends into the interior of the solution tank from the opening. A waste solution tank holds waste solution. The waste solution tank comprises an upper opening and a substantially hollow interior. A drain conduit extends into the interior of the waste solution tank from the opening. A pump circulates solution. The pump is in fluid communication with the suction conduit of the solution tank. An inlet conduit carries solution to the engine. The inlet conduit is adapted for connection to the oil fill opening of the engine. An outlet conduit carries solution away from the engine. The outlet conduit is connected to the oil drain opening of the engine. A transport cart carries the pump, solution and waste solution tanks.

Robert et al., U.S. Pat. No. 5,566,781 describes an apparatus and method for flushing and cleaning the oil strainer and crankcase of an internal combustion engine of a type having a removable full-flow oil filter. The oil filter is temporarily replaced with a cartridge which has at least one passage therethrough which will communicate with the discharge side of the engine oil pump but does not communicate with the normal outflow port of the filter apparatus. A second passage therethrough may communicate with the outflow port of the filter system but does not communicate with the discharge of the oil pump. In a preferred method, the inlet of the first passage may be connected to a source of pressurized fluid to force the fluid, in a direction opposite to normal flow, through the passage, the oil pump and the oil strainer to agitate and flush contaminants in the oil strainer and crankcase. The pressurized fluid and contaminants are drained from the crankcase after which the cartridge is removed, a new oil filter installed and clean oil added to the engine.

Chen, U.S. Pat. No. 5,482,062 describes a method and an apparatus for complete fluid exchange and internal system flushing of an automatic transmission system as the transmission system operates. The apparatus is connectable to the transmission system and, in a preferred embodiment, is operable at an adjustable output fluid flow rate and pressure setting to act as an independent fluid supply and storage system for the automatic transmission system in the course of a fluid exchange and flushing operation. In addition to its application to an automatic transmission system, the apparatus of the present invention can be used to flush the fuel system of any internal combustion engine. This reference refers to the automatic transmission system and potentially the fuel system of an automobile.

Our prior art search with abstracts described above teaches various apparatus and methods for fluid exchange in automobiles. The references teach entry and exit from an engine through conventional openings in a radiator, an engine oil pan filler port and through a drain plug. However, the references do not teach the use of penetration elements adapted for using a replaceable oil filter unit as a connector for draining and for replacing an oil charge from an engine. The present invention fulfills these needs and provides further related advantages as described in the following summary.

SUMMARY OF THE INVENTION

The present invention teaches certain benefits in construction and use which give rise to the objectives described below.

The present invention provides an apparatus and use that offers significant advantages to alternatives. In general the invention enables fluid exchange through the wall of a canister using a clamp having a pair of jaws capable of gripping the outside surface of the canister. One of the jaws provides a tubular entry device positioned capable of penetrating the canister's surface when the jaws are tightened so that a hole is formed and sealed around the entry device by a seal. The other of the pair of jaws provides a rotatable conformal surface capable of being oriented for nesting contact with the canister so as to improve the ability of the clamp to secure itself on the canister. In one application the present invention is used for replacing motor oil in an automotive engine. The prior art teaches that motor oil is best replaced by allowing the oil to drip from a drain hole in the engine's oil pan. Once this drain hole is once again plugged, new oil is admitted through a fill tube. Problems with this process include that it is time consuming and inconvenient. A further problem is that when the oil filter is removed, residual oil left in the filter most frequently drips onto the engine and floor, etc. One must go under the vehicle in order to remove and replace the plug. One must wait for the spent oil to drain by gravity. In the method of the present invention, these problems are overcome. Without placing the vehicle on a lift or removing its oil filter, the oil filer canister is gripped and punctured one or more times by the clamp, and then with the tubular entry device interconnected with a vacuum source, the spent oil is suctioned out of the vehicle through the oil filter. Alternatively, with the vehicle's engine operating, the engine's oil pump delivers the spent oil to the oil filter where it can be received by the entry device for removal, again, by suction. A flush solution may be then forced into the lubrication system through the tubular entry device and then removed in the same manner as with the removal of the used oil. The engine may be running or not at this time. Other fluid exchange steps may be taken at this time as well, such as multiple flushes. Finally, the punctured old oil filter is removed and replaced by a new filter and new oil is delivered into the lubrication system in the conventional manner through the oil inlet pipe. Clearly, the problem described above of oil dripping when the oil filter is removed is overcome by this method. In the traditional oil replacement method described above, the removal of residual oil from the oil filter before its removal from the engine is advantageous for the same reasons. The invention is not limited to use in replacing oil or to motor vehicles. The invention may be used for any application wherein a canister holding a fluid or receiving a continuous supply of fluid may be punctured in order to access the fluid or to replace it.

A primary objective of one embodiment of the present invention is to provide an apparatus and method of use of such apparatus that yields advantages not taught by the prior art.

Another objective is to assure that an embodiment of the invention is capable of gaining access to a canister by puncture for fluid transfer.

A further objective is to assure that an embodiment of the invention is capable of attachment to a circular surface with a compressive grip.

A still further objective is to assure that an embodiment of the invention is capable of such a compressive grip although the axis of the invention is not aligned with nor orthogonal to the axis of the part being gripped.

A yet further objective is to assure that an embodiment of the invention is adaptive to the alignment of the axis of the invention with the axis of the part being gripped.

Other features and advantages of the embodiments of the present invention will become apparent from the following more detailed description, taken in conjunction with the accompanying drawings, which illustrate, by way of example, the principles of at least one of the possible embodiments of the invention.

BRIEF DESCRIPTION OF THE DRAWINGS

The accompanying drawings illustrate at least one of the best mode embodiments of the present invention. In such drawings.

DETAILED DESCRIPTION OF THE INVENTION

The above described drawing figures illustrate the present invention in at least one of its preferred, best mode embodiments, which is further defined in detail in the following description. Those having ordinary skill in the art may be able to make alterations and modifications in the present invention without departing from its spirit and scope. Therefore, it must be understood that the illustrated embodiments have been set forth only for the purposes of example and that they should not be taken as limiting the invention as defined in the following.

Figure 1:
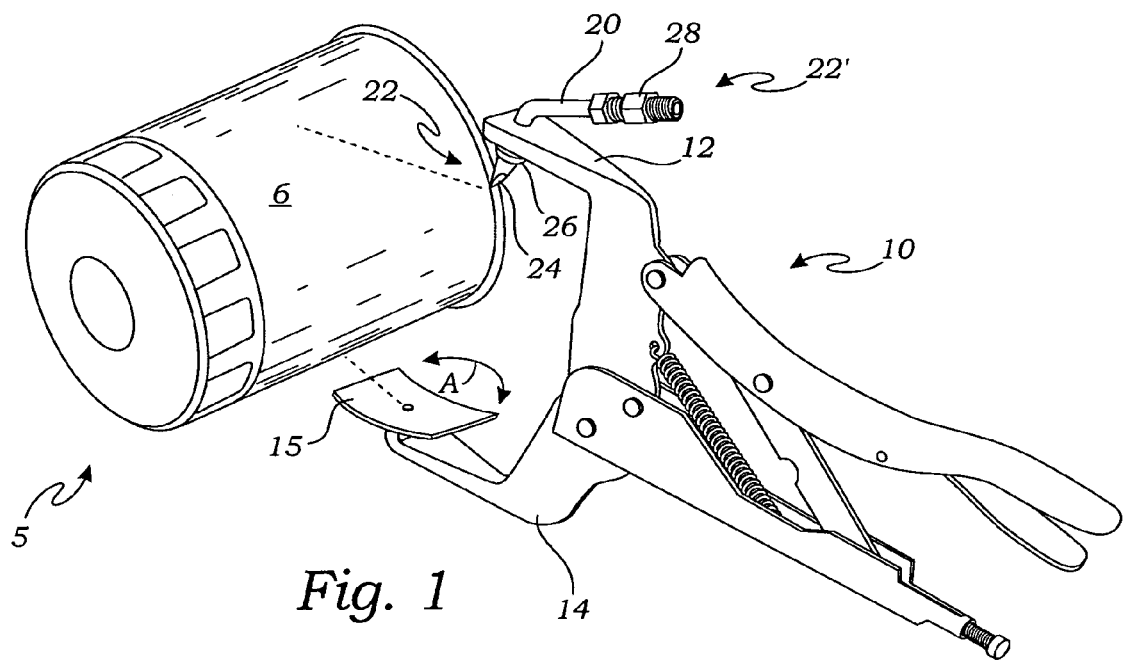
FIG. 1 is a perspective view of one embodiment of the invention showing a vice-clamping mechanism in an open attitude in proximity to, and ready for clamping to an oil filter.

In one aspect of the present invention an apparatus provides for a fluid exchange through a wall of canister 5. A clamp 10, preferably a vise-grip type of clamping tool, well known in the art as a vice-grip pliers, has a pair of jaws 12 and 14 which are enabled by the well-known way in which the vise grip tool operates, for very tightly gripping the canister 5. Referring to FIG. 1, it is seen that one of the pair of jaws 12 is modified to provide a tubular entry device 20 for penetrating the canister 5 when the jaws 12 and 14 are tightened on the canister 5. By this means, the tubular entry device 20 establishes fluid communication with the canister 5. In an important application of the present invention, the canister 5 may be an automotive oil filter, as shown in the figures. Such an oil filter is constructed with an outer enclosure made of thin sheet metal. Just as a canned food product can be easily pierced by a can-opener, the tubular entry device 20 is able to pierce the canister 5.

Figure 3:
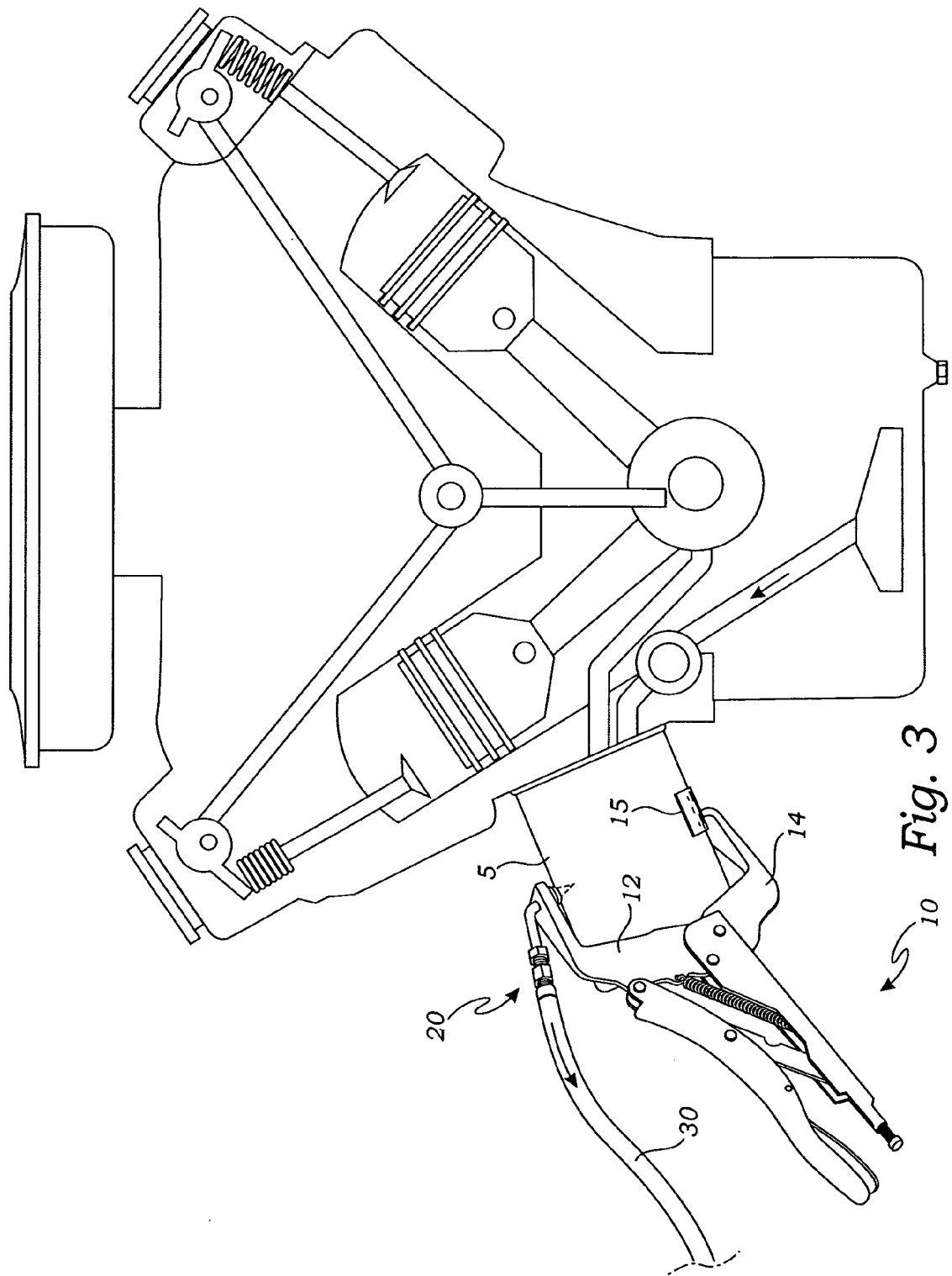
FIG. 3 is a side elevational view thereof showing the oil filter as engaged with an engine (shown in schematic form) for fluid exchange.

The apparatus preferably further includes a fluid conduit 30, such as a hose, which is engaged with the tubular entry device 20 for directing fluid communication exterior to the canister 5, i.e., fluid entering the canister 5 may be removed through the tubular entry device 20, as is shown in FIG. 3, and likewise, fluid may be injected into the canister 5 through the fluid conduit 30 and the tubular entry device 20, may then enter whatever apparatus is engaged with the canister 5, e.g., the internal combustion engine of FIG. 5.

Figure 2:
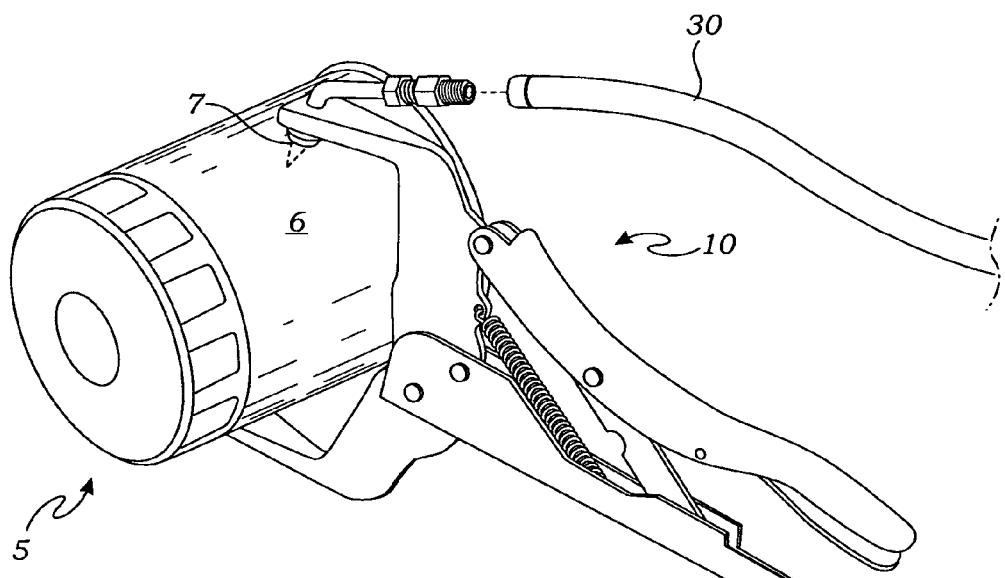
FIG. 2 is a perspective view thereof showing the clamping mechanism engaged with the oil filter and, additionally, a hose ready for engagement with the clamping mechanism.

The tubular entry device 20, in order to penetrate the metal wall of the canister 5, is enabled for cutting a hole in an exterior surface 6 of the canister 5 to afford entry of the tubular entry device 20 into the canister 5. This enablement is preferably as follows. The tubular entry device 20, at one end 22, is designed to puncture the canister 5 and to accomplish this, it is formed as a conical convergent tube with an off-axial open terminal edge 24. This edge 24 is sharp and comes to a point so as to be able to penetrate the surface 6 of the canister 5 forming a hole 7. This is best seen in FIGS. 1 and 2. The tubular entry device 20 terminates at an opposite end 22' with a fitting 28 for receiving the fluid conduit 30 as is well known in the art. Such a fitting may be any well known type and is preferably a quick-disconnect type.

The tubular entry device 20 preferably provides a seal 26, such as a rubber grommet, enabled for sealing the hole 7 in the exterior surface 6 of the canister 5 when the tubular entry device 20 penetrates and is held against the exterior surface 6.

The other of the pair of jaws 14 provides a rigid surface 15 conformal to the exterior surface 6 of the canister 5 which improves securement of the clamp 10 on the canister 5. As shown in FIG. 1, this rigid surface 15 is preferably curved to nestle against the canister 5 and is mounted pivotally so that it may be rotated as shown by arrow "A" in FIG. 1. In this manner, the clamp 10 may approach and close onto the canister 5 from any direction. A positioning of the clamp 10 in an off-axis direction is shown in FIG. 3.

In one embodiment, the present invention comprises the clamp 10 with its tubular entry device 20 mounted on one of the jaws 12, and its rotatable rigid surface 15 mounted on the other of the jaws 14. In a further embodiment, the present invention comprises the combination of the clamp 10 plus the canister 5 as they form a working relationship for fluid transfer.

The present invention further comprises the method of fluid exchange enabled by the above described apparatus. In this method, the canister 5 is gripped by the jaws 12, 14 of clamp 10 and is penetrated at its exterior surface 6 by the tubular entry device 20 for fluid communication with the canister. The method further includes the step of engaging the fluid conduit 30 with the tubular entry device 20 for directing fluid communication exterior to the canister, as for instance when it is desired to extract oil from an engine as shown in FIG. 3. In this case, the oil may be sucked out by vacuum means through the oil filter without removing the oil drain plug in the oil pan. Fresh oil may then be installed in the usual manner through the oil inlet tube. After the oil has been replaced, it is then necessary to replace the oil filter with a new one.

The method of the present invention, as stated, includes cutting the hole 7 in the exterior surface 6 of the canister 5 with the tubular entry device 20 by pressing the tubular entry device 20 into the canister 5, and this is easily accomplished using a leveraged clamp such as the vise-grip pliers shown, which has the ability to apply relatively large clamping forces.

The method further includes the step of forming a seal 26 on the tubular entry device 20 and thus sealing the hole 7 in the surface 6 as the tubular entry device 20 penetrates the exterior surface 6 of the canister 5.

The method further includes the step of providing the rigid surface 15 on the other of the pair of jaws 14 where the rigid surface 15 conforms to the exterior surface 6, and further, placing the rigid surface 15 into contact with the canister surface 6.

The method also includes the step of rotating the rigid surface 15 to comply with the exterior surface 6 of the canister 5 so that the surfaces 6 and 15 form a nesting relationship as shown in FIG. 3.

The method may also include the steps of applying one of a suction and a pressure to the tubular entry device 20 in order to cause fluid exchange therethrough.

The enablements described in detail above are considered novel over the prior art of record and are considered critical to the operation of at least one aspect of the instant invention and to the achievement of the above described objectives.

The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or elements of the embodiments of the herein described invention and its related embodiments not described are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments or that a single element may be substituted for two or more elements in a claim.

Changes from the claimed subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. An apparatus for use in fluid exchange through a canister, the apparatus comprising: a clamp having a pair of jaws enabled for gripping the canister; the pair of jaws providing a tubular entry device positioned on one of the pair of jaws for penetrating the canister when the jaws are tightened on the canister; the other of the pair of jaws providing a rigid curved surface mounted pivotally thereon, the tubular entry device thereby establishing fluid communication with the canister.

2. The apparatus of claim 1 further comprising a fluid conduit engaged with the tubular entry device for directing fluid communication exterior to the canister.

3. The apparatus of claim 1 wherein the tubular entry device is enabled for cutting a hole in an exterior surface of the canister for entry of the tubular entry device into the canister.

4. The apparatus of claim 3 wherein the tubular entry device provides a seal enabled for sealing the hole in the exterior surface of the canister around the tubular entry device when the tubular entry device penetrates the exterior surface of the canister.

5. The apparatus of claim 3 wherein the rigid surface is conformal to the exterior surface of the canister for securement of the clamp on the canister.

6. The apparatus of claim 5 wherein the rigid surface is rotatable about the other of the pair of jaws.

7. The apparatus of claim 1 wherein the clamp is a vise grip pliers providing a spring for maintaining the clamp in a closed attitude.

8. An apparatus for use in fluid exchange comprising: a canister having an exterior surface; and a clamp having a pair of jaws gripping the canister; one of the pair of jaws providing a tubular entry device positioned on the one of the jaws and penetrating the exterior surface of the canister, the tubular entry device in fluid communication with the canister; the other of the jaws providing a rigid curved surface mounted pivotally thereon.

9. The apparatus of claim 8 further comprising a fluid conduit engaged with the tubular entry device for directing fluid communication exterior to the canister.

10. The apparatus of claim 8 wherein the tubular entry device is enabled for cutting a hole in the exterior surface of the canister thereby providing entry of the tubular entry device into the canister.

11. The apparatus of claim 10 wherein the tubular entry device provides a seal enabled for sealing the hole in the surface of the canister around the tubular entry device when the tubular entry device penetrates the exterior surface of the canister.

12. The apparatus of claim 10 wherein the rigid surface is conformal to the exterior surface of the canister and in contact therewith for securement of the clamp on the canister.

13. The apparatus of claim 12 wherein the rigid surface is rotatable.

14. The apparatus of claim 8 wherein the clamp is a vise grip pliers providing a spring for maintaining the clamp in a closed attitude.

15. A method of fluid exchange comprising the steps of: providing a canister having an exterior surface; gripping the canister surface with a clamp having a pair of jaws; providing one of the pair of jaws with a tubular entry device and another of the pair of jaws with a rigid curved pivotal surface; gripping the conister with the jaws; and penetrating the exterior surface of the canister with the tubular entry device for fluid communication with the canister.

16. The method of claim 15 further comprising the step of engaging a fluid conduit with the tubular entry device for directing fluid communication exterior to the canister.

17. The method of claim 15 further comprising the step of cutting a hole in the exterior surface of the canister with the tubular entry device pressing the tubular entry device into the canister.

18. The method of claim 15 further comprising the step of forming a seal on the tubular entry device and sealing the hole in the surface of the canister around the tubular entry device as the tubular entry device penetrates the exterior surface of the canister.

19. The method of claim 15 further comprising the step of rotating the rigid surface to comply with the exterior surface of the canister.

20. The method of claim 15 further comprising the step of applying suction to the tubular entry device for extracting a fluid from the canister.

21. The method of claim 15 further comprising the step of applying pressure to the tubular entry device for injecting a fluid into the canister.

* * * * *